United States Patent
Yoshifuku et al.

(10) Patent No.: US 7,661,706 B2
(45) Date of Patent: Feb. 16, 2010

(54) VEHICLE OCCUPANT SENSING SYSTEM

(75) Inventors: Masashi Yoshifuku, Wako (JP); Naotaka Kumakiri, Wako (JP); Takashi Furukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/181,526

(22) Filed: Jul. 29, 2008

(65) Prior Publication Data

US 2009/0033075 A1 Feb. 5, 2009

(30) Foreign Application Priority Data

Jul. 30, 2007 (JP) ............................. 2007-197686

(51) Int. Cl.
*B60R 21/16* (2006.01)

(52) U.S. Cl. ...................................... 280/735
(58) Field of Classification Search .................. 280/735
See application file for complete search history.

(56) References Cited

U.S. PATENT DOCUMENTS

2003/0001368 A1 * 1/2003 Breed et al. ................. 280/735

2007/0127811 A1 * 6/2007 Luo ............................ 382/159

FOREIGN PATENT DOCUMENTS

JP 03-248946 11/1991

\* cited by examiner

*Primary Examiner*—Faye M. Fleming
(74) *Attorney, Agent, or Firm*—Rankin, Hill & Clark LLP (57) ABSTRACT

A vehicle occupant sensing system includes a plurality of image pickup devices arranged to capture a three-dimensional image in a region including at least a cover part of the front airbag system and an upper part of the front passenger seat, and a signal processing unit for processing image signals taken by the image pickup devices to determine a three-dimensional position of the captured image. The signal processing unit is configured to determine a three-dimensional position of a part of the captured image pertaining to the cover part and includes a storage section which stores in advance a reference three-dimensional position corresponding to an external configuration of the cover part, and a comparing section which compares the three-dimensional position of the image part pertaining to the cover part with the reference three-dimensional position to determine if there is an object placed on the cover part.

2 Claims, 7 Drawing Sheets

VEHICLE OCCUPANT SENSING SYSTEM

FIELD OF THE INVENTION

The present invention relates to a vehicle occupant sensing system for detecting the size and posture of the front seat occupant by using a stereo camera.

BACKGROUND OF THE INVENTION

Modern airbag systems generally employ a so-called "seamless design" according to which the position of an airbag cannot be easily recognized by a vehicle occupant. The seamless design allows the vehicle occupant to unintentionally place an object, such as map, mobile phone or the like, on a lid or cover part of the front airbag module, which is provided or formed as an integral part of the vehicle instrument panel. When the front airbag module is activated to deploy an airbag at a collision, the object on the cover part will hinder proper deployment of the airbag and may strike and injure an occupant of the front passenger seat disposed in front of the front airbag module.

Figure 10:
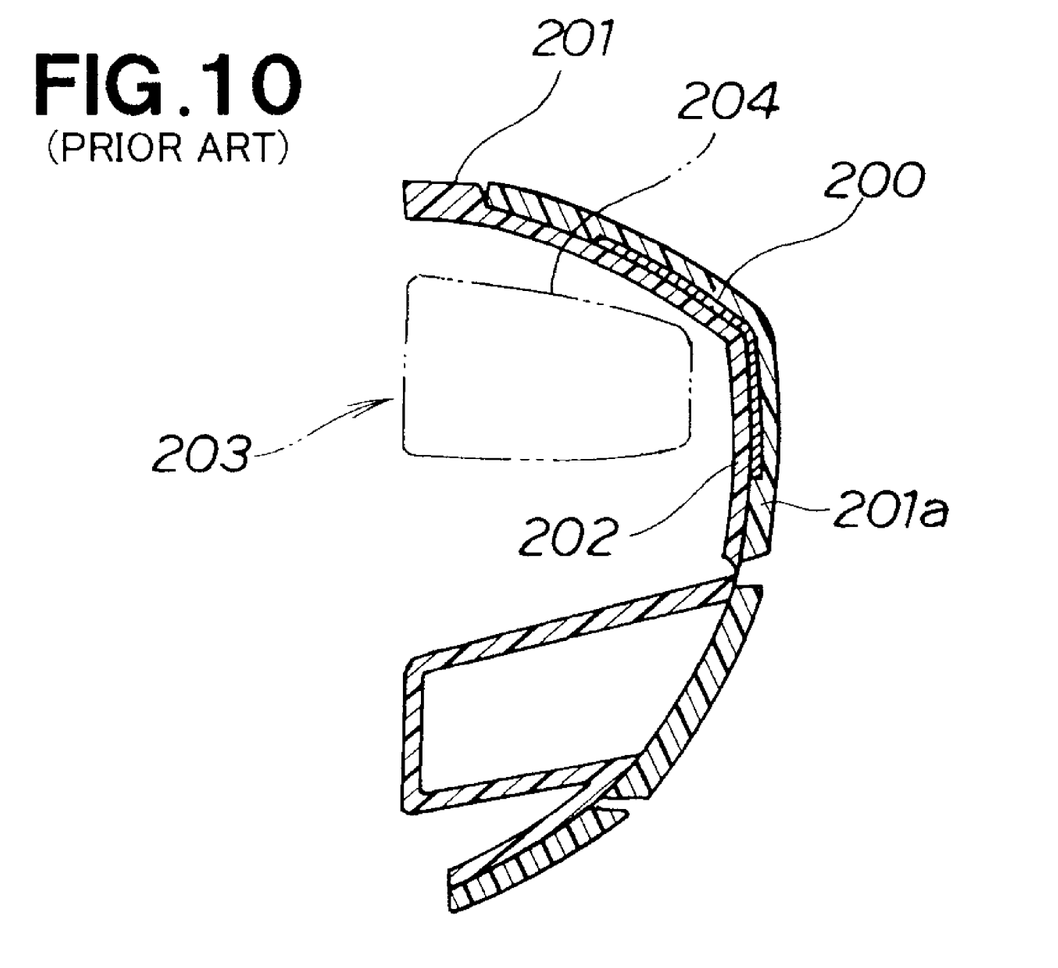
FIG. 10 is a cross-sectional view showing a conventional front airbag system equipped with a touch sensor.

To deal with this problem, a front airbag system disclosed in Japanese Patent Application Laid-Open Publication No. 3-248946 (JP 3248946 A) includes, as shown in FIG. 10 hereof, a detection device 200 mounted on a front side of an instrument panel 201 for undertaking detection of an object which is in contact with a part of the instrument panel 201 forming a lid or cover part 202 of a front airbag module 203. The detecting device 200 consists of a touch sensor formed by a pressure-sensitive resistance sheet disposed below a skin layer 201a of the instrument panel 201. The touch sensor (detecting device) 200 is electrically connected to a control unit (not shown) of the front airbag module 203 for ensuring proper deployment control of an airbag 204 of the front airbag module 203. More particularly, when the touch sensor (detecting device) 200 detects an occupant of the front passenger seat or an object, which is in contact with the cover part region 202 of the instrument panel 201 from the outside, this sensor 200 issues a detection signal to suppress deployment of the airbag 204.

However, the touch sensor 200 assembled in the instrument panel 201 increases the manufacturing cost. Furthermore, due to difficulties in adjusting the detection sensitivity to accommodate various objects of different weights, the touch sensor 200 is likely to involve detection errors, which will allow improper deployment of the airbag 204 tending to cause an injury of the occupant of the front passenger seat.

SUMMARY OF THE INVENTION

With the foregoing drawbacks of the prior art in view, an object of the present invention is to provide a vehicle occupant sensing system, which is capable of detecting, with high detection accuracy without involving undue increase in the manufacturing cost, an object placed on a lid or cover part of the front airbag system provided or formed as an integral part of the vehicle instrument panel.

According to the present invention, there is provided a occupant sensing system for a vehicle equipped with a front airbag system including an airbag normally received in an instrument panel of the vehicle at a position located in front of a front passenger seat, and a cover part formed as an integral part of the instrument panel at a position corresponding to the position of the airbag. The occupant sensing system comprises a plurality of image pickup devices disposed on an upper part of a passenger compartment of the vehicle and arranged to capture a three-dimensional image in a region including at least the cover part of the front airbag system and an upper part of the front passenger seat, and a signal processing unit for processing image signals taken by the image pickup devices to determine a three-dimensional position of the image captured by the image pickup devices. The signal processing unit is configured to determine a three-dimensional position of a part of the captured image pertaining to the cover part of the front airbag system. The signal processing means includes a storage section which stores in advance a reference three-dimensional position corresponding to an external configuration of the cover part, and a comparing section which compares the determined three-dimensional position of the image part pertaining to the cover part of the front airbag system with the stored reference three-dimensional position corresponding to the external configuration of the cover part of the front airbag system to determine if there is an object placed on the cover part of the front airbag system.

If comparison performed by the comparing section shows a mismatch between the three-dimensional position determined by the signal processing unit and the reference three-dimensional position stored in the storage section, it is determined that an object is present on the cover part of the front airbag system. Based on this determination, the comparing section in one preferred form issues a command signal to activate a warning device and temporarily suppress deployment of the airbag of the front airbag system until the object is removed from the cover part of the front airbag system. By thus controlling operations of the warning device and the front airbag system, it is possible to protect the occupant of the front passenger seat from injury which may occur when the front airbag is activated to deploy the airbag without regard to the presence of the object on the cover part of the front airbag system.

Preferably, each of the image pickup devices comprises an infrared image pickup device which takes an image using infrared light. In this instance, the occupant sensing system further comprises infrared reflecting means disposed on the cover part for reflecting the infrared light or infrared absorbing means disposed on the cover part for absorbing the infrared light. The infrared image pickup devices and the infrared reflecting or absorbing means, which are thus used in combination, make it possible to perform an image sensing operation in the dark and provide a higher degree of sensing accuracy.

BRIEF DESCRIPTION OF THE DRAWINGS

A certain preferred embodiment of the present invention will be described in detail below, by way of example only, with reference to the accompanying drawings, in which.

DETAILED DESCRIPTION OF THE PREFERRED EMBODIMENT

Figure 1:
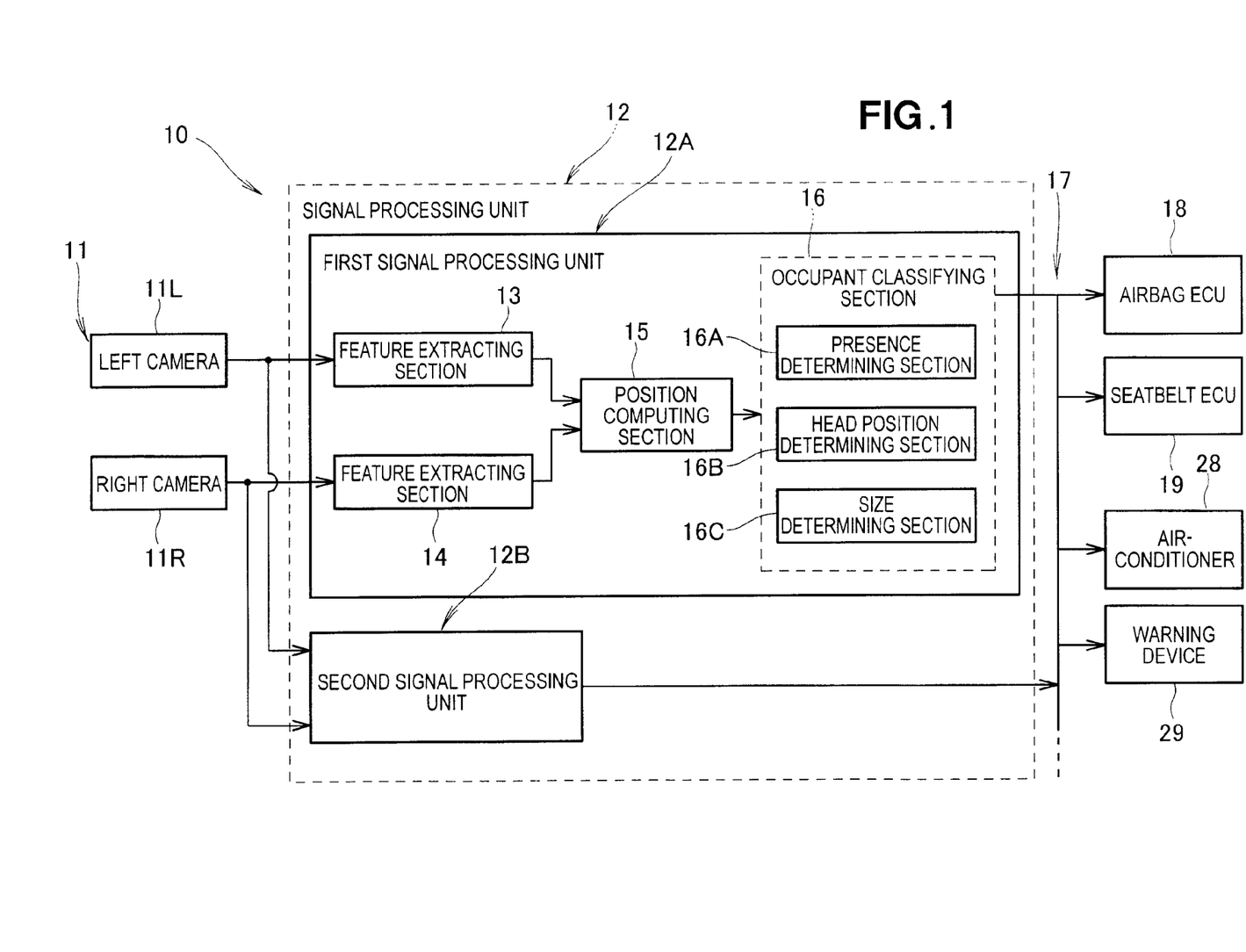
FIG. 1 is a block diagram showing the general configuration of a vehicle occupant sensing system according to an embodiment of the present invention.

Referring now to the drawings and FIG. 1 in particular, there is shown in block diagram the general configuration of a vehicle occupant sensing system 10 according to a preferred embodiment of the present invention. The vehicle occupant sensing system 10 is designed not only to detect the presence, size and posture of an occupant 51 (FIG. 7) of a front passenger seat 52 (FIG. 7) for making the necessary adjustments to a front airbag system 50 (FIG. 7), a seatbelt pretensioner (only an electronic control unit (ECU) 19 thereof being shown in FIG. 1) associated with the front passenger seat 52, an air-conditioner (only an ECU 28 thereof being shown in FIG. 1) and other in-vehicle devices, but also to detect an object (not shown) placed on a lid or cover part 25 (FIGS. 6 and 7) of the front airbag system 50, which is provided or formed as an integral part of an instrument panel 22 of the vehicle 20 at a position corresponding to the position of an airbag 24 (FIG. 7) of the front airbag system 50, for the purpose of giving due warning to a vehicle occupant (the front seat occupant 51 and/or the driver, not shown) and temporarily suppressing deployment of the airbag 24 until the object is removed from the cover part 25 of the front airbag system 50. The airbag 24 is normally received in a folded, inflatable state in the instrument panel 22.

In the illustrated preferred embodiment, the vehicle occupant sensing system 10 (FIG. 1) includes an infrared reflecting means 26 (FIGS. 6 and 7) disposed on the cover part 25 of the front airbag system 50 for reflecting infrared light or radiation. A preferred example of the infrared reflecting means 26 is an infrared reflective film. The infrared reflecting means 26 may be replaced by an infrared absorbing means, such as an infrared absorbing film. The provision of the infrared reflecting means 26 or the infrared absorbing means is not an essential requirement for the vehicle occupant sensing system 10, but may be omitted according to the circumstances.

Figure 6:
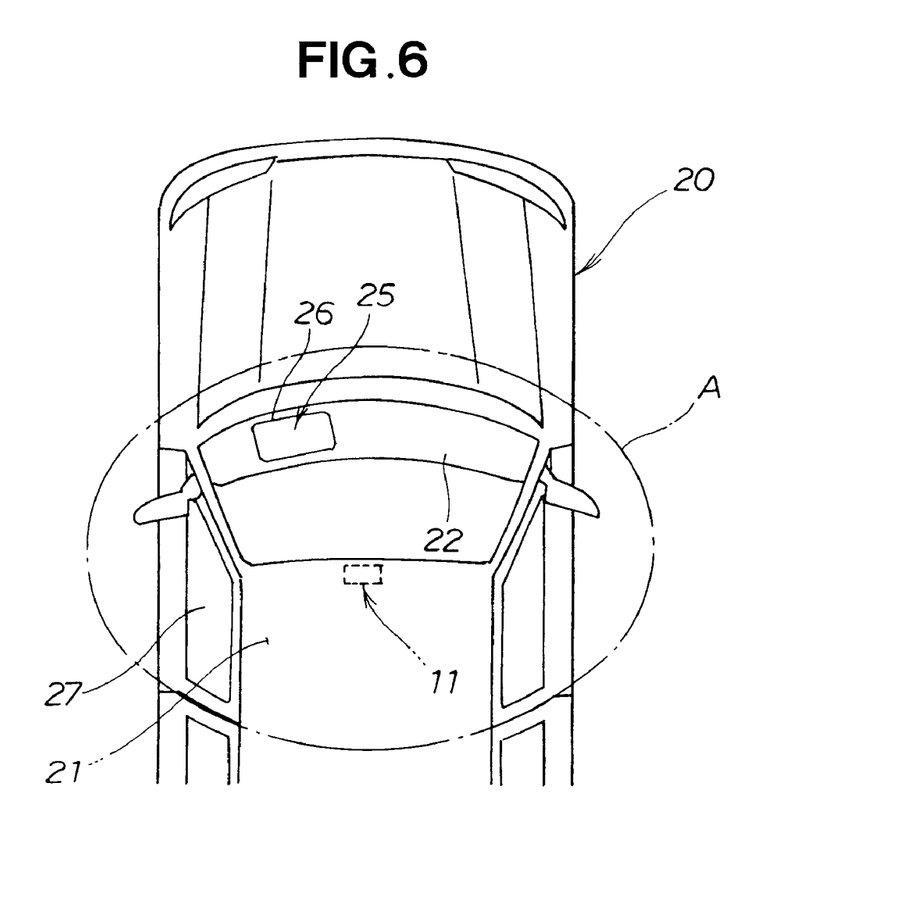
FIG. 6 is a fragmentary plan view of an automotive vehicle in which the occupant sensing system of the present invention is incorporated.
Figure 7:
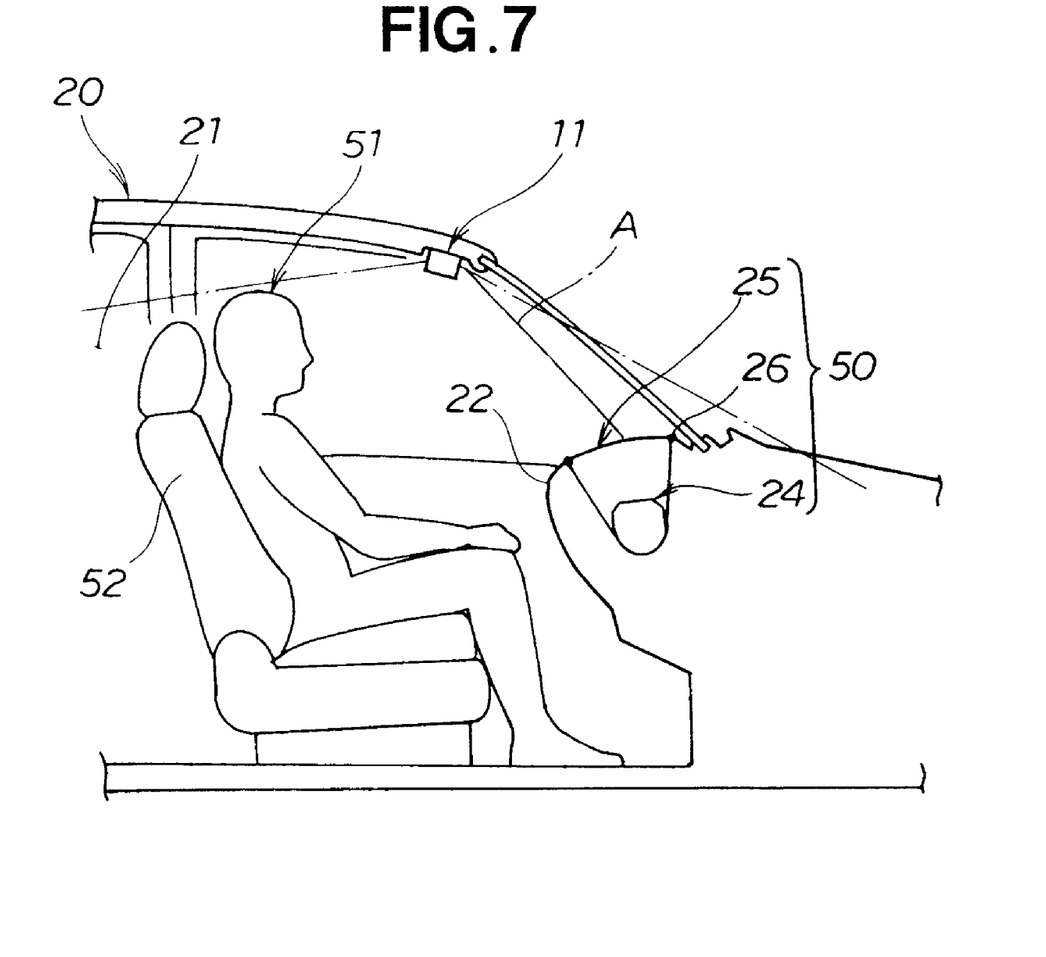
FIG. 7 is a diagrammatical view showing a passenger compartment of the vehicle shown in FIG. 6.

As shown in FIG. 1, the vehicle occupant sensing system 10 generally comprises a stereo camera unit 11 and a signal processing means or unit 12. The stereo camera unit 11 has a right camera 11R and a left camera 11L that are disposed on an upper part of the passenger compartment 21 (FIG. 7) and arranged to capture a three-dimensional image in a region A (indicated by dot-and-dash lines shown in FIGS. 6 and 7) including at least the cover part 25 of the front airbag system 50 and an upper part of the front passenger seat 52 (FIG. 7). The right and left cameras 11R, 11L each form an image pickup device according to the present invention. As will be understood from FIG. 7, the imaging region A includes a path of deployment of the airbag 24 extending from the cover part 25 of the airbag system 50 toward the upper part of the front passenger seat 52. Reference numeral 27 shown in FIG. 6 designates a left side window of the vehicle 20. The signal processing unit 12 is usually constituted by a camera unit electronic control unit (ECU) associated with the stereo camera unit 11. The signal processing unit 12 may be provided separately from the stereo camera unit 11.

Figure 2:
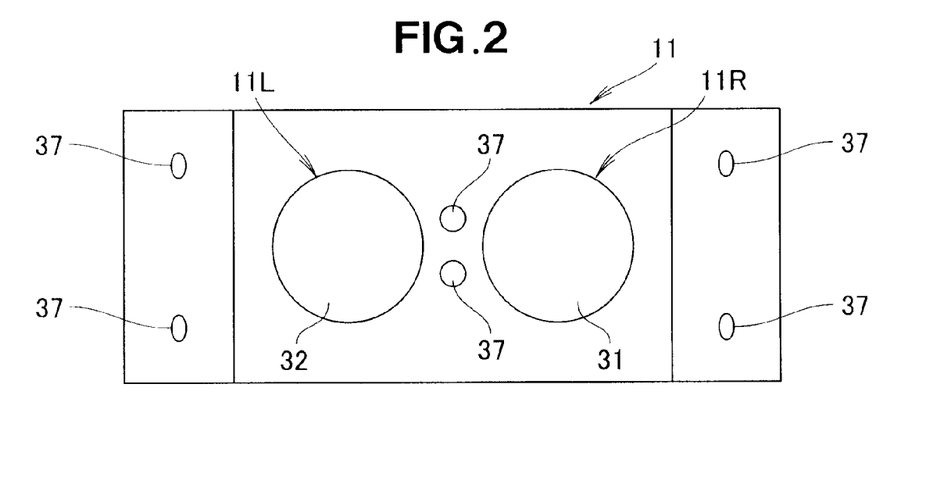
FIG. 2 is a front elevational view of a camera unit used in the vehicle occupant sensing system.
Figure 3:
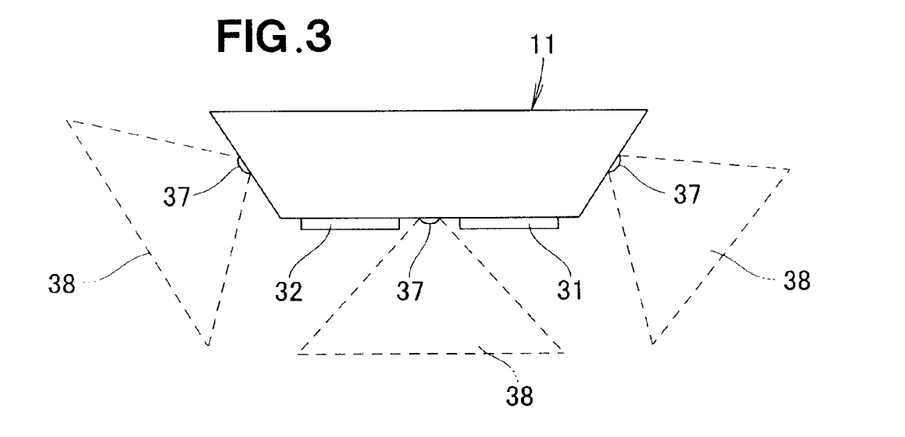
FIG. 3 is a plan view of the camera unit.
Figure 4:
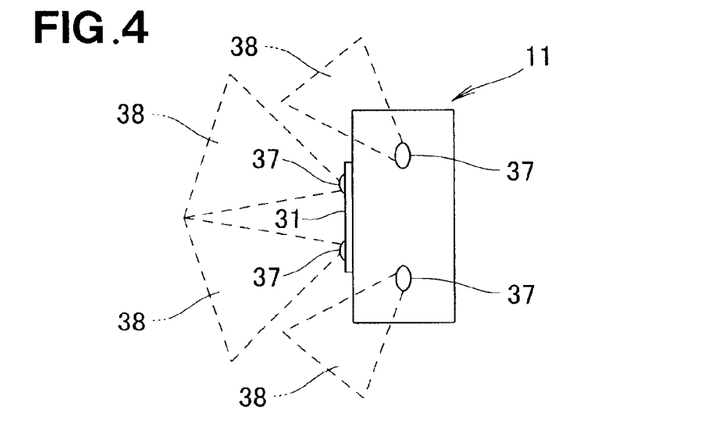
FIG. 4 is a side view of the camera unit.
Figure 5:
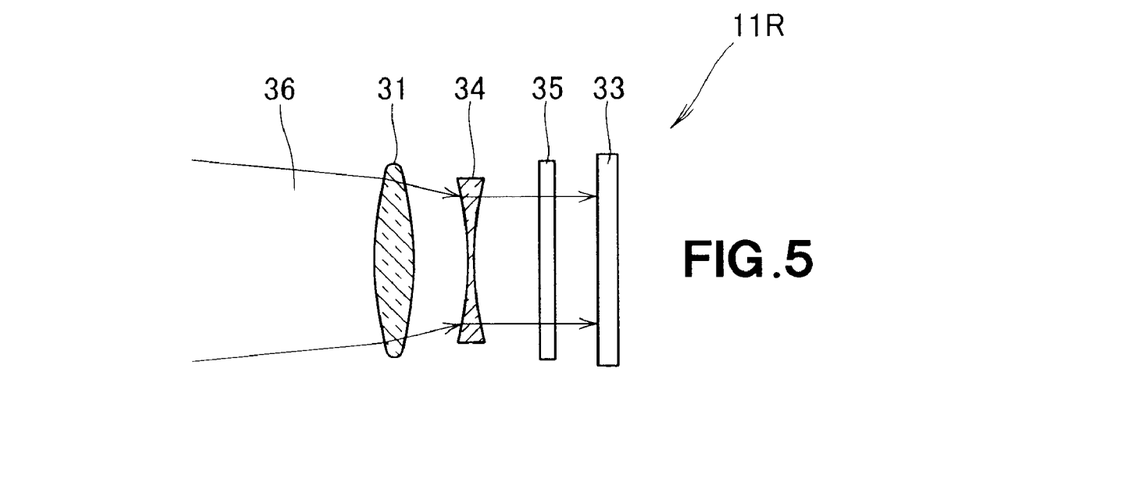
FIG. 5 is a diagrammatical view showing an internal structure of the camera unit.

The stereo camera unit 11 will be described in further detail with reference to FIGS. 2-5. As shown in FIGS. 2-4, the stereo camera unit 11 includes the afore-mentioned right and left camera 11R and 11L. From the standpoint of imaging accuracies, infrared cameras (infrared image pickup devices) are used as the right and left cameras 11R, 12L as they are used in combination with the infrared reflecting means 26 (FIGS. 6 and 7). Reference numeral 31 shown in FIG. 2 denotes an objective lens of the right infrared camera 11R and reference numeral 32 denotes an objective lens of the left infrared camera 11L. As shown in FIG. 5, the right infrared camera 11R includes the objective lens 31, a double-concave lens 34 disposed behind the objective lens 31, a filter 35 disposed behind the double-concave lens 34, and a light-sensitive element or device 33 such as a CCD device disposed behind the filter 35. Incoming light 36 enters the right infrared camera 11R from the front side (left side in FIG. 2), then travels successively through the objective lens 31, the double-concave lens 34 and the filter 35, and finally falls on an acceptance surface of the light-sensitive element (CCD device) 33. The light 36 is collimated as it passes through the double-concave lens 34. The collimated light impinges perpendicularly on an incidence plane of the filter 35, then goes through or penetrates the filter 35, and finally impinges perpendicularly on the acceptance surface of the light-sensitive element (CCD device) 33. The left infrared camera 11L is the same in structure as the right infrared camera 11R described just above with reference to FIG. 5 and further description thereof can be omitted. Each camera 11R, 11R may further include a wide-angle lens (not shown).

The stereo camera unit 11 further includes a plurality (six in the illustrated embodiment) of light-emitting elements or devices 37 each constituted by an infrared-emitting diode, namely a light-emitting diode which emits infrared radiation especially in the near-infrared region. The infrared-emitting diodes 37 are arranged in pairs such that a first pair of infrared-emitting diodes 37 is disposed on a front surface of the stereo camera unit 11 intermediately between the right and left infrared cameras 11R, 11L and emits infrared radiation in forward and obliquely upward and downward directions. A second pair of infrared-emitting diodes 37 is disposed on a right side surface of the infrared camera unit 11 and emits infrared radiation in diagonally forward and obliquely upward and downward directions. A third pair of infrared-emitting diodes 37 is disposed on a left side surface of the infrared camera unit 11 and emits infrared radiation in diagonally forward and obliquely upward and downward directions. Each of the infrared-emitting diodes 37 has an irradiation range 38 indicated by broken lines shown in FIGS. 3 and 4. The irradiation ranges 38 collectively provide a total irradiation range substantially corresponding to the imaging region A (FIGS. 6 and 7) of the stereo camera unit 11. Infrared-emitting operation of the infrared-emitting diodes 37 may be performed either continuously or intermittently.

The infrared image pickup devices 11R, 11L and the infrared reflecting means 26, which are used in combination, make it possible to perform an image sensing operation in the dark and provide a higher degree of sensing accuracy. The infrared reflecting means 26 (FIGS. 6 and 7) can be omitted according to the circumstances in which instance, CMOS devices may be used as the light-sensitive elements 33 in place of the CCD devices and a stereo camera unit using the CMOS devices can also operate properly in the same manner as the stereo camera unit 11 equipped with the CCD devices.

Referring back to FIG. 1, the signal processing unit 12 is configured to process image signals taken by the right and left cameras (image pickup devices) 11R, 11L of the stereo camera unit 11 to thereby determine a three-dimensional position of an image captured by the stereo camera unit 11. More particularly, the signal processing unit 12 is configured such that a three-dimensional position of a part of the captured image pertaining to the occupant 51 (FIG. 7) of the front passenger seat 52 and a three-dimensional position of a part of the captured image pertaining to the cover part 25 (FIGS. 6 and 7) of the front airbag system 50 can be determined independently from each other. To this end, the signal processing unit 12 includes a first signal processing means or unit 12A for processing image signals taken by the stereo camera unit 11 in such a manner as to determine a three-dimensional position of a part of the captured image pertaining to the occupant 51 (FIG. 7) of the front passenger seat 52, and a second signal processing means or unit 12B for processing the image signals taken by the stereo camera unit 11 in such a manner as to determine a three-dimensional position of a part of the captured image pertaining to the cover part 25 (FIGS. 6 and 7) of the front airbag system 50.

The first signal processing unit 12A includes two feature extracting sections 13 and 14 connected respectively to the left and right cameras 11L and 11R for extracting part of the image signals pertaining to information about positional features of the occupant 51 (FIG. 7) of the front passenger seat 52, a position computing section 15 for computing positional information about the occupant 51 on the basis of the extracted image signal part output from the feature extracting sections 13, 14, and an occupant classifying section 16 for undertaking detection and classification of the size and posture of the occupant 51 on the basis of the positional information computed by the position computing section 15. The positional features of the occupant 52 to be extracted by the feature extracting sections 13, 14 include the head position of the occupant 51 and the size of the occupant 51. The occupant classifying section 16 includes a presence determining section 16A, a head position determining section 16B and a size determining section 16C. Based on the positional information represented by an output signal from the position computing section 15, the presence determining section 16A determines the presence of the occupant 51, the head position determining section 16B determines the head position of the occupant 51, and the size determining section 16C determines the size of the occupant 51.

Output signal from the first signal processing unit 12A, which is indicative of the results of three determinations performed by the occupant classifying section 16, is supplied via a controller area network (CAN) 17 to a main control unit (not shown), the airbag ECU 18, the seatbelt ECU 19, the air-conditioner 28, a warning device 29 and any other in-vehicle device (not shown) for making the necessary adjustments to the in-vehicle devices including the front airbag system 50 (FIG. 7), the non-illustrated seatbelt pretensioner associated with the front passenger seat 52 (FIG. 7), and the air-conditioner 28. The warning device 29 may be formed by an indicator which gives a visual warning, a buzzer which gives a sound warning, or a voice alarm which gives an audio warning.

Figure 8:
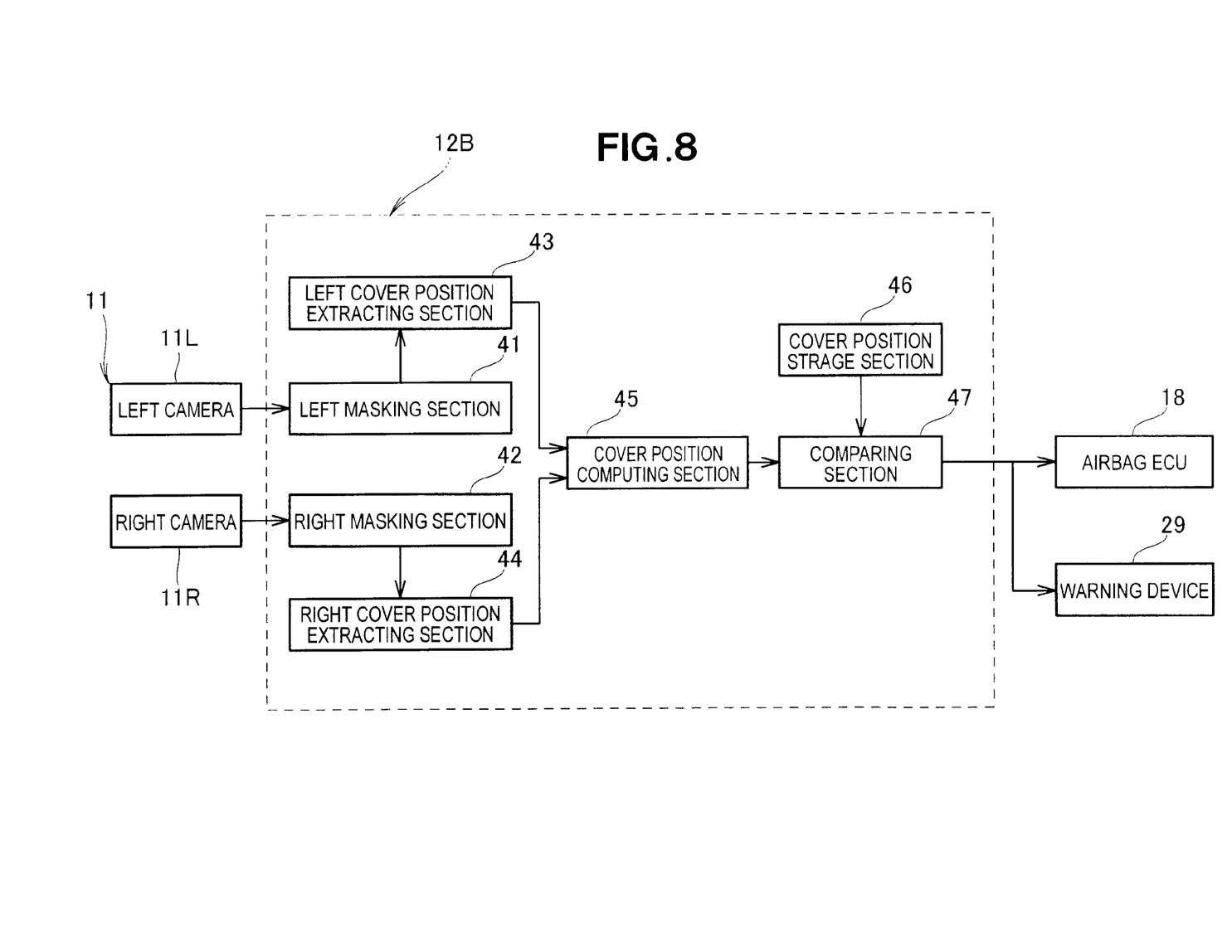
FIG. 8 is a block diagram showing the configuration of a second signal processing unit shown in FIG. 1.

As shown in FIG. 8, the second signal processing unit 12B includes a left masking section (left preprocessing section) 41 which extracts from an image captured by the left camera 11L an image portion or segment pertaining to the cover part 25 (FIGS. 6 and 7) of the front airbag system 50 and its surroundings. The second signal processing unit 12B also including a left cover position extracting section 43 which extracts from the image segment extracted by the left masking section 41 an image part corresponding to an external configuration of the cover part 25, a right masking section (right preprocessing section) 42 which extracts from an image captured by the right camera 11R an image portion or segment pertaining to the cover part 25 and its surroundings. The second signal processing unit 12B further including a right cover position extracting section 44 which extracts from the image segment extracted by the right masking section 42 an image part corresponding to the external configuration of the cover part 25, a cover position computing section 45 which determines, by computation based on the image parts extracted by the left and right cover position extracting sections 43 and 44, a three-dimensional position of a part of the captured image pertaining to the cover part 25, a cover position storage section 46 which stores in advance a reference three-dimensional position corresponding to an external configuration of the cover part 25 which is free from an object placed thereon, and a comparing section 47 which compares the determined three-dimensional position of the image part pertaining to the cover part 25 of the front airbag system 50 with the stored reference three-dimensional position corresponding to the external configuration of the cover part 25 of the front airbag system 50 to determine if there is a mismatch.

If a mismatch (between the determined three-dimensional position and the stored reference three-dimensional position) is determined by comparison, this means that there is an object placed on the cover part 25 (FIGS. 6 and 7) of the front airbag system 50, and the comparing section 47 issues a command signal to activate the warning device 28 and instruct the airbag ECU 18 to temporarily suppress deployment of the airbag 24 until the object is removed from the cover part 25 of the front airbag system 50. Alternatively, if a match (between the determined three-dimensional position and the stored reference three-dimensional position) is determined by comparison, this means that there is no object placed on the cover part 25 of the front airbag system 50, and the comparing section 47 issues a command signal to keep the warning device 28 in an deactivated state and instruct the airbag ECU 18 to permit deployment of the airbag 24 when a collision occurs.

Figure 9:
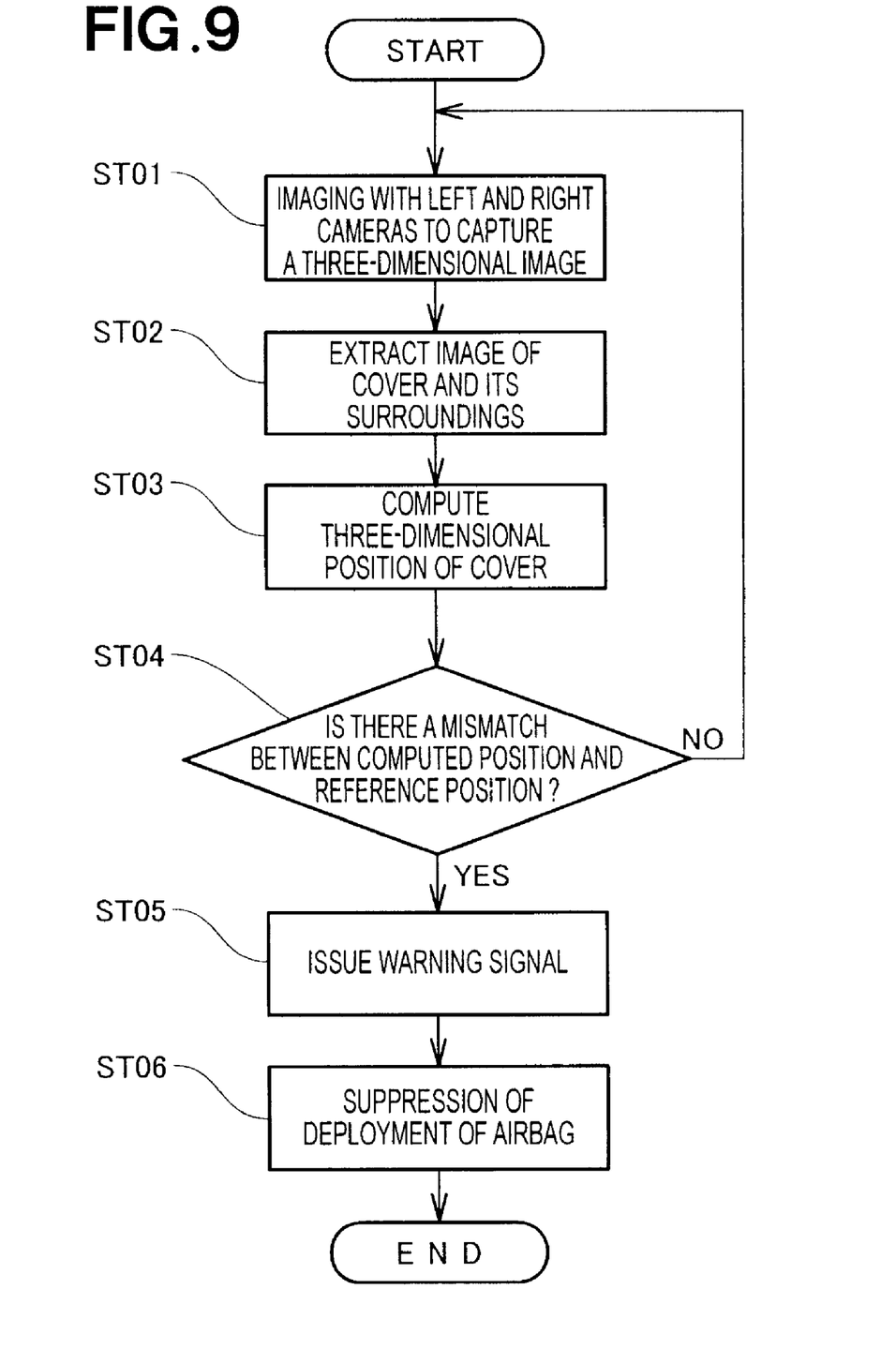
FIG. 9 is a flowchart showing a sequence of operations to be achieved by the second signal processing unit.

FIG. 9 is a flowchart showing a sequence of operations to be achieved by the second signal processing unit 12B (FIG. 8). As shown in FIG. 9, operation of the second signal processing unit 12B begins at a step ST01 where imaging with the right and left cameras (image pickup devices) 11R, 11L is performed over the imaging region A (FIGS. 6 and 7) to capture a three-dimensional image.

The step ST01 is followed by a step ST02, which performs in succession a masking operation by the left masking section 41 (FIG. 8) to extract from an image captured by the left camera 11L a portion or segment of the captured image pertaining to the cover part 25 (FIGS. 6 and 7) of the front airbag system 50 and its surroundings, an extracting operation by the left cover position extracting section 43 (FIG. 8) to extract from the image segment extracted by the left masking section 41 an image part corresponding to an external configuration of the cover part 25. In synchronism with the aforesaid masking operation and extracting operation, step ST02 also performs in succession a masking operation by the right masking section 42 (FIG. 8) to extract from an image captured by the right camera 11R an image portion or segment pertaining to the cover part 25 and its surroundings, an extracting operation by the right cover position extracting section 44 (FIG. 8) to extract from the image segment extracted by the right masking section 42 an image part corresponding to the external configuration of the cover part 25.

At the next step ST03, the image parts extracted by the left and right cover position extracting sections 43 and 44 (FIG. 8) are used to perform a computing operation achieved by the cover position computing section 45 (FIG. 8) to determine a three-dimensional position of a part of the captured image pertaining to the cover part 25. The thus determined three-dimensional position of the image part pertaining to the cover part 25 of the front airbag system 50 is subjected to comparison with a reference three-dimensional position which is stored in advance in the cover position storage section 46 (FIG. 8). Such comparison (comparing operation) is performed in a step ST04 by means of the comparing section 47 (FIG. 8) so as to determine if there is a mismatch. If the determination in step ST04 is affirmative (YES: there is a mismatch determined by comparison), this means that there is an object (including a body part of the occupant 51 shown in FIG. 7, or an article such as map, mobile phone or the like) placed on the cover part 25 of the front airbag system 50, and operation goes on to a step ST05 where a command signal is issued from the comparing section 47 to activate the warning device 28 (FIG. 8). The warning signal is also used in the next step ST06 to instruct the airbag ECU 18 (FIG. 8) to temporarily suppress deployment of the airbag 24 (FIG. 7) until the object is removed from the cover part 25 of the front airbag system 50. By thus controlling operations of the warning device 29 and the front airbag system 50, it is possible to protect the occupant 51 from injury which may occur due to improper deployment of the airbag 24 caused when the front airbag system 50 is activated without regard to an object placed on the cover part 25 of the front airbag system 50.

Alternatively, if the determination in step ST04 is negative (NO: there is no mismatch determined by comparison between the determined and reference positions), this means that there is no object placed on the cover part 25 of the front airbag system 50, and operation returns to step ST01.

It should be appreciated that the constructions, shapes, positional relationships have been explained above in relation to various examples only to the extent that the present invention can be appropriately understood and carried out, and that the numerical values and materials given above are just illustrative. Namely, the present invention should not be construed as limited to the above-described embodiment and examples and may be modified variously unless it departs from the technical scope indicated by the appended claims.

Obviously, various minor changes and modifications of the present invention are possible in light of the above teaching. It is therefore to be understood that within the scope of the appended claims the invention may be practiced otherwise than as specifically described.

What is claimed is:

1. An occupant sensing system for a vehicle equipped with a front airbag system including an airbag normally received in an instrument panel of the vehicle at a position located in front of a front passenger seat, and a cover part formed as an integral part of the instrument panel at a position corresponding to the position of the airbag, said occupant sensing system comprising:

a plurality of image pickup devices disposed on an upper part of a passenger compartment of the vehicle and pointed toward the instrument panel and the front passenger seat to capture a three-dimensional image in a region including at least the cover part of the front airbag system in the instrument panel of the vehicle and an upper part of the front passenger seat; and signal processing means for processing image signals taken by the image pickup devices to determine a three-dimensional position of the image captured by the image pickup devices, the signal processing means being configured to determine a three-dimensional position of a part of the captured image pertaining to the cover part of the front airbag system, said signal processing means including:

a storage section which stores in advance a reference three-dimensional position corresponding to an external configuration of the cover part; and a comparing section which compares the determined three-dimensional position of the image part pertaining to the cover part of the front airbag system with the stored reference three-dimensional position corresponding to the external configuration of the cover part of the front airbag system to determine if there is an object placed on the cover part of the front airbag system.

2. The occupant sensing system of claim 1, wherein each of the image pickup devices comprises an infrared image pickup device which takes an image using infrared light, and wherein the occupant sensing system further comprises infrared reflecting means disposed on the cover part for reflecting the infrared light or infrared absorbing means disposed on the cover part for absorbing the infrared light.

* * * * *